(12) United States Patent
Spagnoli et al.

(10) Patent No.: US 11,110,826 B2
(45) Date of Patent: Sep. 7, 2021

(54) SLIDING DEVICE FOR A VEHICLE SEAT

(71) Applicant: MARTUR ITALY S.R.L., Milan (IT)

(72) Inventors: Luigi Spagnoli, Grugliasco (IT); Can Üstünberk, Grugliasco (IT)

(73) Assignee: MARTUR ITALY S.R.L., Milan (IT)

( * ) Notice: Subject to any disclaimer, the term of this patent is extended or adjusted under 35 U.S.C. 154(b) by 9 days.

(21) Appl. No.: 16/615,159

(22) PCT Filed: Apr. 17, 2019

(86) PCT No.: PCT/IB2019/053167
§ 371 (c)(1),
(2) Date: Nov. 20, 2019

(87) PCT Pub. No.: WO2019/224624
PCT Pub. Date: Nov. 28, 2019

(65) Prior Publication Data
US 2021/0046851 A1 Feb. 18, 2021

(30) Foreign Application Priority Data
May 25, 2018 (IT) .......................... 102018000005731

(51) Int. Cl.
*B60N 2/08* (2006.01)
*B60N 2/07* (2006.01)

(52) U.S. Cl.
CPC ......... *B60N 2/0887* (2013.01); *B60N 2/0705* (2013.01); *B60N 2/0806* (2013.01)

(58) Field of Classification Search
CPC .. B60N 2/0887; B60N 2/0705; B60N 2/0806; B60N 2/0715; B60N 2/0725;
(Continued)

(56) References Cited

U.S. PATENT DOCUMENTS 5,584,460 A 12/1996 Ropp
5,829,728 A 11/1998 Hoshihara et al.
(Continued)

FOREIGN PATENT DOCUMENTS

CN 204340739 U 5/2015
CN 204701480 U 10/2015
(Continued)

OTHER PUBLICATIONS

International Search Report and Written Opinion of the International Searching Authority dated Jul. 26, 2019 for International Patent Application No. PCT/IB2019/053167.

*Primary Examiner* — Nkeisha Smith
(74) *Attorney, Agent, or Firm* — Howson & Howson LLP (57) ABSTRACT

The present invention relates to a sliding device (1) for a vehicle seat. The sliding device comprises a pair of parallel slideways (3a, 3b), each of which comprises a lower rail (5a, 5b), an upper rail (7a, 7b) slidably mounted to the lower rail and a latch (21a, 21b) for allowing/preventing a movement of the upper rail relative to the lower rail; a releasing member (29) is provided for driving said latches to a position in which the upper rails are free to move relative to the lower rails. According to the invention, each latch (21a, 21b) comprises a rear portion which is bent into a "U"-like shape and comprises a lower leg carrying latching elements (37a, 37b) configured to cooperate with corresponding latching elements (41a, 41b) provided in the lower rail and an upper leg configured to engage the releasing member (29). The design of the latches of the sliding device of the invention allows to improve the reliability of said sliding device.

12 Claims, 9 Drawing Sheets

(58) Field of Classification Search
CPC . B60N 2/073; B60N 2/07; B60N 2/06; B60N 2/08; B60N 2/0812; B60N 2/0818; B60N 2/0831; B60N 2/0837; B60N 2/0843; B60N 2/085; B60N 2/0875; B60N 2/0862
USPC .......................................... 248/424, 429, 430
See application file for complete search history.

(56) References Cited

U.S. PATENT DOCUMENTS

| | | | |
|---|---|---|---|
| 6,773,068 B2 | 8/2004 | Shinozaki | |
| 7,931,246 B2 | 4/2011 | Brewer et al. | |
| 8,550,420 B2 | 10/2013 | Wojatzki et al. | |
| 8,708,300 B2* | 4/2014 | Fujishiro | B60N 2/4214 |
| | | | 248/429 |
| 9,033,299 B2 | 5/2015 | Kramm et al. | |
| 9,056,561 B2* | 6/2015 | Hayashi | B60N 2/0887 |
| 9,073,455 B2 | 7/2015 | Hayashi | |
| 9,145,070 B2* | 9/2015 | Hayashi | B60N 2/0705 |
| 9,150,125 B2* | 10/2015 | Hayashi | B60N 2/0705 |
| 9,283,870 B2 | 3/2016 | Yamada et al. | |
| 9,371,013 B2 | 6/2016 | Nakamura et al. | |
| 9,469,217 B2* | 10/2016 | Hayashi | B60N 2/0732 |
| 9,616,777 B2* | 4/2017 | Arakawa | B60N 2/073 |
| 10,086,721 B2* | 10/2018 | Arakawa | B60N 2/0705 |
| 10,195,963 B2 | 2/2019 | Flick et al. | |
| 2003/0209930 A1 | 11/2003 | Horsfield et al. | |
| 2009/0051208 A1 | 2/2009 | Szybisty et al. | |
| 2012/0205512 A1 | 8/2012 | Fujishiro et al. | |
| 2020/0391619 A1 | 12/2020 | Krpo et al. | |
| 2020/0391620 A1* | 12/2020 | Krpo | B60N 2/0875 |
| 2020/0398704 A1 | 12/2020 | Krpo et al. | |
| 2020/0406785 A1 | 12/2020 | Krpo et al. | |
| 2021/0053469 A1 | 2/2021 | Spagnoli et al. | |

FOREIGN PATENT DOCUMENTS

| | | |
|---|---|---|
| EP | 0752338 A1 | 1/1997 |
| FR | 2969967 A1 | 7/2012 |
| JP | 2015-083426 A | 4/2015 |
| WO | 2007/094012 A2 | 8/2007 |
| WO | 2014/049238 A1 | 4/2014 |
| WO | 2015/151181 A1 | 10/2015 |

* cited by examiner

SLIDING DEVICE FOR A VEHICLE SEAT

TECHNICAL FIELD OF THE INVENTION

The present invention relates to a sliding device for a vehicle seat.

More particularly, the present invention relates to a sliding device for a vehicle seat which guarantees an improved reliability with respect to accidental, undesired sliding of the vehicle seat relative to the vehicle floor.

Prior Art

Vehicle seats generally have a sliding function for pushing or pulling the seat cushion in a forward or backward direction, a height adjustment function for adjusting the height of the seat cushion and a reclining function for adjusting the inclination of the seat backrest relative to the seat cushion.

The aforesaid sliding function is generally implemented by a sliding device which comprises a pair of parallel slideways, each of which comprises a lower rail attached to the vehicle floor and an upper rail attached to the vehicle seat, the upper rail being constrained to the lower rail, but being able to slide relative to said lower rail.

Each slideway of the sliding device further comprises a latch for allowing/preventing movement of the upper rail relative to the lower rail. Such latch is normally in a locking position, in which it prevents the upper rail from sliding with respect to the lower rail, thus avoiding accidental displacements of the seat with respect to the vehicle floor. The sliding device is further provided with a releasing member which can be used by a user for moving the latches of the slideways to an unlocking position, in which the upper rail is free to move relative to the lower rail, so that the position of the seat with respect to the vehicle floor can be adjusted. Such releasing member can be made, for instance, as a "U"-shaped handle having two substantially parallel arms, the end portions of which are configured to simultaneously act upon respective latches of the slideways of the sliding device for driving them to their unlocking position.

Such a sliding device is disclosed, for instance, in patent applications EP 752 338, FR 2 969 967 and WO 2014/049238.

However, a sliding device of the kind disclosed in the aforesaid document is not free from drawbacks.

More particularly, the latches of said device shows poor reliability with respect to the engagement both with the respective slideways and with the releasing member, so that they easily become disengaged from said slideways and/or from said releasing member, therefore causing malfunctioning of the sliding device.

Moreover, the latches of said device are designed so that the fulcrum of the releasing member is at the opposite end of the latches with respect to the portion of the latches engaging the lower rails. As a result, even a slight, accidental movement of the releasing member can be sufficient for moving the latches in their unlocking position and allowing the upper rails to slide relative to the lower rails, so that the risk of an accidental, undesired displacement of the vehicle seat relative to the vehicle floor cannot be effectively avoided.

Therefore, the main object of the present invention is to obviate to such drawbacks by providing a sliding device comprising latches having an improved design, allowing to improve the reliability of the sliding device.

This and other objects are achieved by a sliding device as claimed in the appended claims.

SUMMARY OF THE INVENTION

The sliding device of the invention comprises a pair of parallel slideways, each of which comprises a lower rail, an upper rail slidably mounted to said lower rail and a latch for selectively allowing/preventing movement of said upper rail relative to said lower rail, wherein each of the latches is received inside the respective slideway and is arranged between the upper and lower rails; the sliding device of the invention is further provided with a releasing member for simultaneously switching said latches from a locking position in which the movement of the upper rails of the slideways relative to the respective lower rails is prevented, to an unlocking position, in which the movement of the upper rails of the slideways relative to the respective lower rails is allowed, said releasing member being preferably made as a "U"-shaped handle having two substantially parallel arms, the end portions of which are configured to simultaneously act upon respective latches of said slideways.

According to the invention, each of said latches comprises a front portion which is fixed to the respective upper rail and a rear portion which is bent into a "U"-like shape and comprises a lower leg carrying latching elements configured to cooperate with corresponding latching elements provided in the lower rail for locking said upper rail relative to said lower rail, and an upper leg configured to engage the releasing member.

In a preferred embodiment of the invention, said upper leg carries engaging elements for engaging corresponding engaging elements provided in the releasing member.

In a preferred embodiment of the invention, the lower rail has a substantially "U"-like shaped cross-section and comprises a lower wall and two upwardly oriented parallel walls, each of which ends with an inwardly and downwardly bent edge, the latching elements of the lower rail comprise a plurality of downwardly extending teeth which are equally spaced along said edges of said lower rail, and the latching elements of the latch correspondingly comprise a plurality of through-holes, arranged on both sides of the lower leg of the rear portion of the latch and configured to receive respective teeth of said lower rail.

In a preferred embodiment of the invention, the engaging elements of the releasing handle comprise a notch provided at the end portion of each arm of said handle and the engaging elements of each latch correspondingly comprise a window, the edge of which engages the notch of a respective arm of the releasing handle.

According to this preferred embodiment, the end portions of the arms of the release handle are tapered beyond the notches.

In a preferred embodiment of the invention, each latch comprises an intermediate portion between its front portion and its rear portion, which intermediate portion extends in a substantially vertical direction and is provided with an opening for the passage of a respective arm of the releasing handle, the edge of said opening being the fulcrum around which the arms of the releasing handle pivot for moving the latches to their unlocking position when actuated by the user.

In a preferred embodiment of the invention, each latch is fixed to the respective upper rail at two different points, which are aligned and spaced apart from each other in the longitudinal direction of said upper rail, so that rotation of the latch relative to the upper rail is effectively prevented.

BRIEF DESCRIPTION OF THE DRAWINGS

Further features and advantages of the invention will become more evident from the detailed description of a preferred embodiment thereof, given by way of non limiting example, with reference to the attached drawing, in which:

FIG. 1b is an exploded view of the sliding device of FIG. 1a

DETAILED DESCRIPTION OF A PREFERRED EMBODIMENT OF THE INVENTION

Figure 1A:
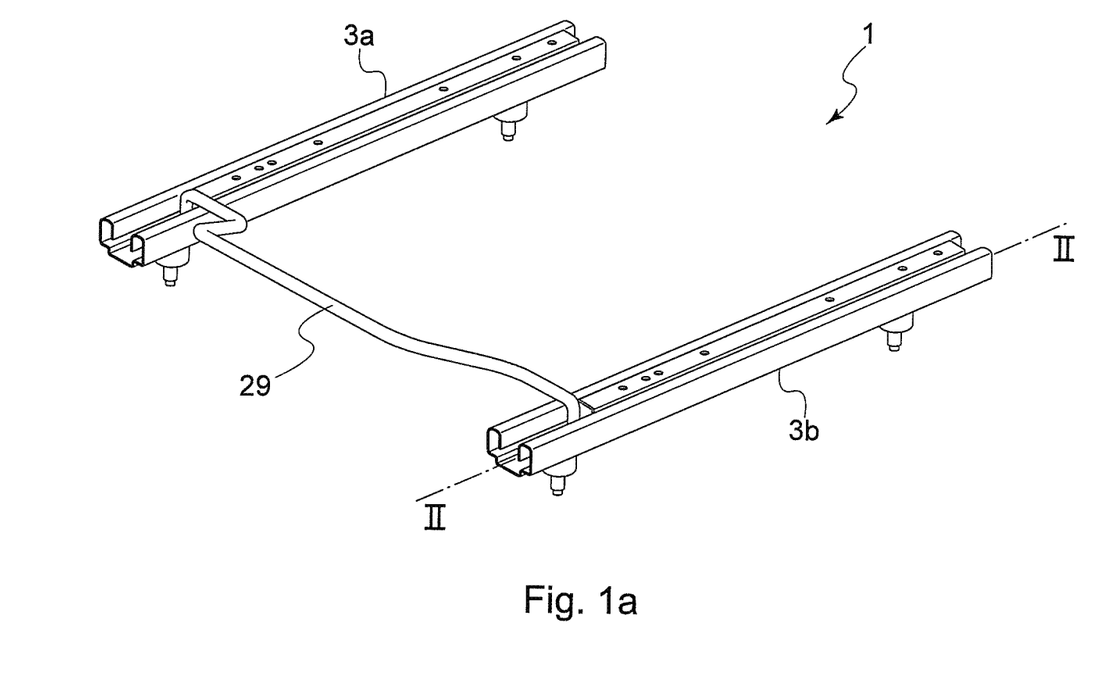
FIG. 1a is a perspective view of a sliding device according to the invention.
Figure 1B:
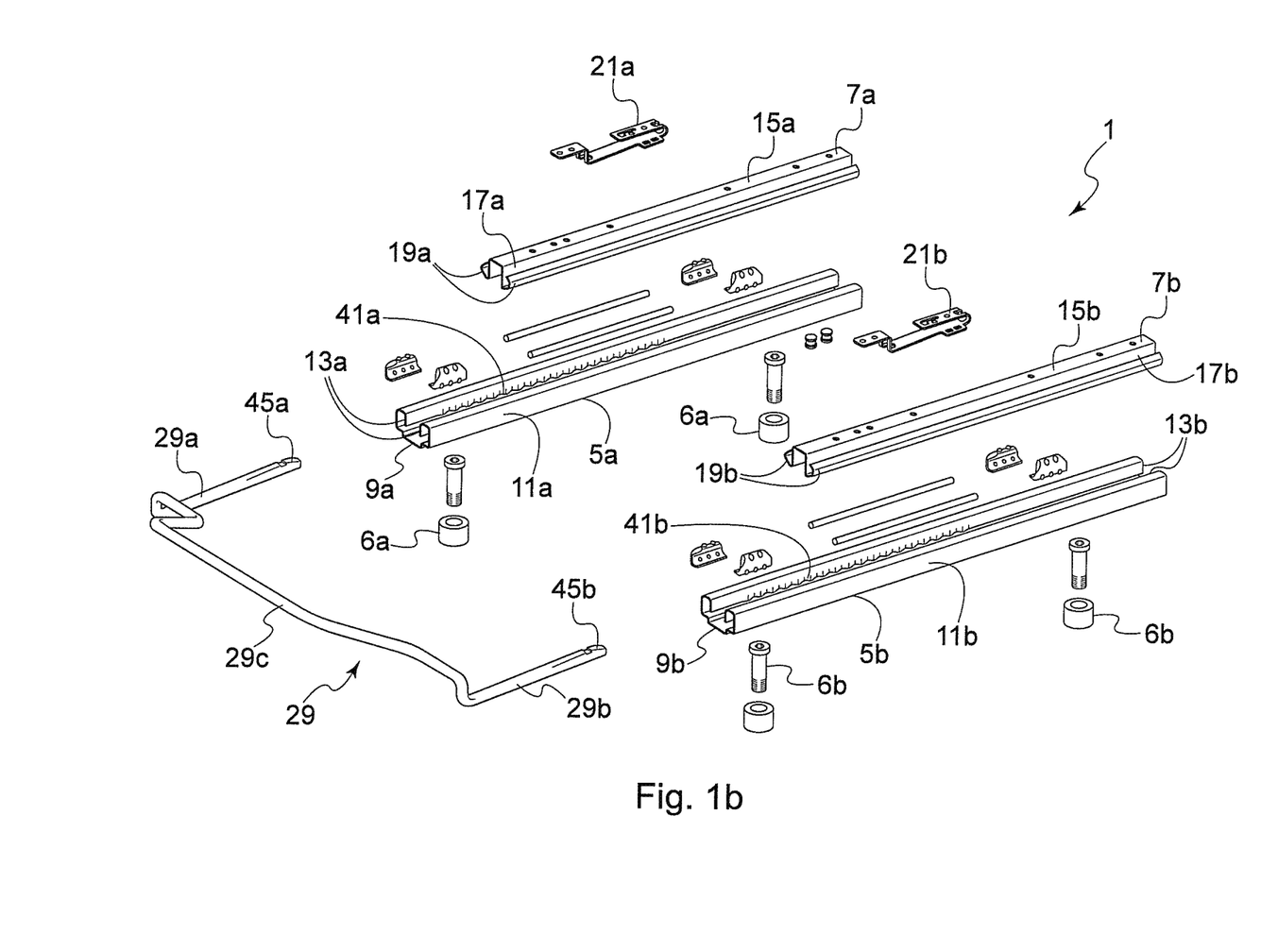

With reference to FIGS. 1a and 1b, a sliding device 1 according to the invention is shown.

In a per se known manner, the sliding device 1 comprises a pair of parallel slideways 3a, 3b, each comprising a lower rail 5a, 5b, intended to be attached to the vehicle floor (for instance by threaded fasteners 6a, 6b), and an upper rail 7a, 7b, intended to be attached to the frame of a vehicle seat.

Each upper rail 7a, 7b is constrained to the respective lower rail. To this purpose, each lower rail has a cross-section having the shape of an upwardly open "U" and comprises a lower wall 9a, 9b and a pair of parallel, upwardly oriented vertical walls 11a, 11b, ending with respective inwardly and downwardly bent edges 13a, 13b; correspondingly, each upper rail has a cross-section having the shape of a downwardly open "U" and comprises an upper wall 15a, 15b and a pair of parallel, downwardly oriented vertical walls 17a, 17b, ending with respective outwardly and upwardly bent edges 19a, 19b: the outwardly and upwardly bent edges 19a, 19b of the upper rails 7a, 7b may become engaged under the inwardly and downwardly bent edges 13a, 13b of the respective lower rails 5a, 5b.

As a result, said upper rails 7a, 7b are constrained to the lower rails 5a, 5b, but can slide relative to said lower rails.

In order to selectively allow/prevent a relative sliding movement between the upper rails and the lower rails, each slideway 3a, 3b is provided with a latch 21a, 21b, which is received in the slideway, between the lower rail and the upper rail.

Figure 3:
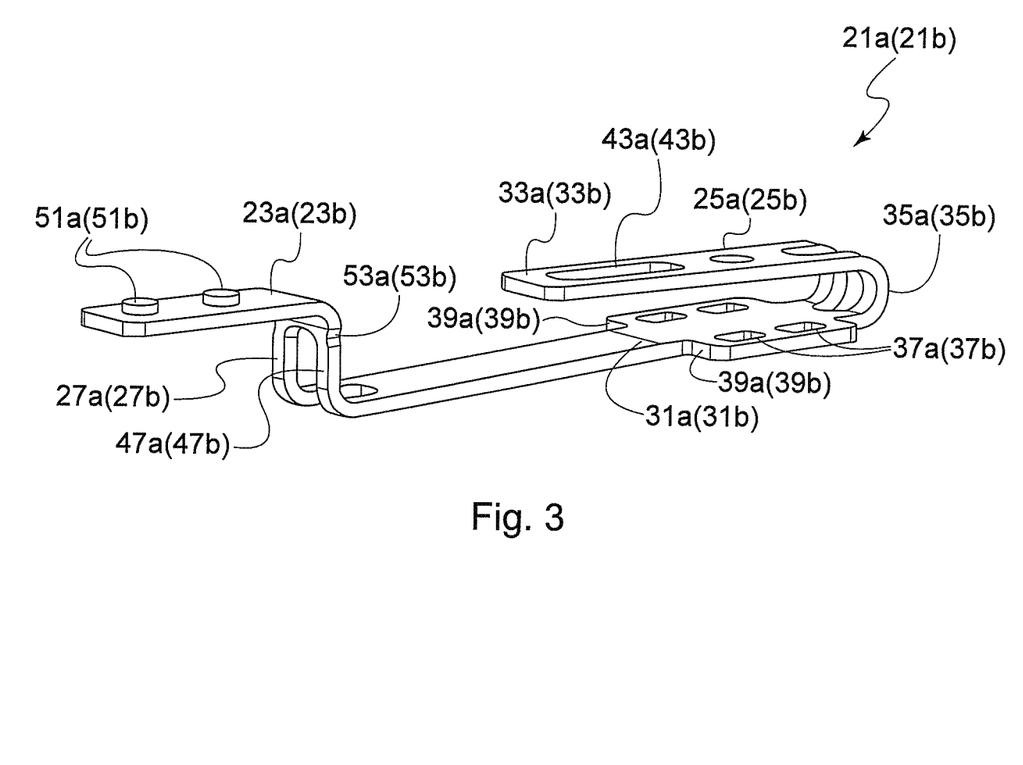
FIG. 3 is a perspective view of one of the latches of the sliding device of FIGS. 1a-1b.

The latches 21a, 21b according to the invention are shown in greater detail in FIG. 3.

Each latch 21a, 21b has a front portion 23a, 23b and a rear portion 25a, 25b, joined by an intermediate portion 27a, 27, wherein said front portion 23a, 23 is fixed to the respective upper rail 7a, 7b and said rear portion 25a, 25b comprises latching elements configured to cooperate with corresponding latching elements provided in the respective lower rail 5a, 5b for preventing the upper rails from sliding relative to the lower rails, as will be explained in detail later.

Under normal conditions, the latches 21a, 21b are in their locking position, in which they prevent the upper rails from sliding relative to the lower rails.

In order to allow a user to adjust the position of the seat relative to the vehicle floor, the sliding device 1 further comprises a releasing member 29, arranged for driving the latches 21a, 21b to an unlocking position, in which they allow the upper rails to slide relative to the lower rails.

The releasing member is made as a "U"-shaped releasing handle 29 comprising a middle gripping portion 29c and two substantially parallel arms 29a, 29b, the end portions of which are arranged to drive the respective latches 21a, 21b to their unlocking position, as will be described in detail later.

According to the invention, the rear portion 25a, 25b of each latch 21a, 21b is bent into a "U" shape and comprises a lower leg 31a, 31b and un upper leg 33a, 33b, joined by a curved, vertically oriented section 35a, 35b.

In the lower leg 31a, 31b, latching elements 37a, 37b are provided, which are configured to cooperate with corresponding latching elements 41a, 41b of the lower rails 5a, 5b for locking the upper rails relative to the lower rails.

In the shown embodiment, the latching elements of the lower rails comprise a plurality of downwardly extending teeth 41a, 41b provided along the inwardly and downwardly bent edges 11a, 11b of the lower rails 5a, 5b.

Correspondingly, the lower leg 31a, 31b of the rear portion of each latch comprises, on both sides thereof, lateral wings 39a, 39b, which extend through openings arranged in vertical walls 17a, 17b of the upper rails 7a, 7b, and one or more through-holes 37a, 37b are provided in each lateral wing, said through-holes 37a, 37b being configured to receive respective teeth 41a, 41b of the lower rails 5a, 5b, thus acting as latching elements of the latch.

In the upper leg 33a, 33b, an engaging element 43a, 43b is provided, which is configured to cooperate with a corresponding engaging element 45a, 45b arranged at the end portion of a respective arm 29a, 29b of the releasing handle for achieving the engagement between said releasing handle and the latches.

Figure 4:
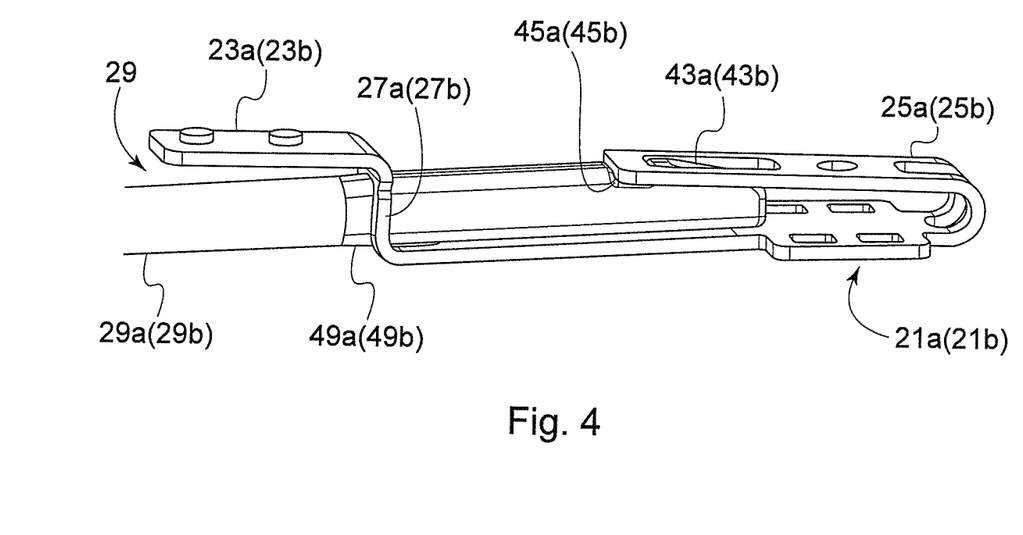
FIG. 4 shows a detail of the sliding device of FIGS. 1a-1b, illustrating the engagement of the releasing handle with the latches.

As can be seen in FIG. 4, in the shown embodiment, the end portion of each arm 29a, 29b of the releasing handle 29 is provided with a notch 45a, 45b as engaging element for the engagement with the respective latch.

Correspondingly, the upper leg 33a, 33b of the rear portion 25a, 25b of each latch is provided with a corresponding window 43a, 43b as engaging element, the edge of said window being arranged to become engaged in the corresponding notch 45a, 45b.

FIG. 4 also shows that each latch 21a, 21b also comprises an intermediate portion 27a, 27b, arranged between the front portion 23a, 23b and the rear portion 25a, 25b, which intermediate portion is substantially vertically oriented and is provided with an opening 47a, 47b for the passage of the respective arm 29a, 29b of the releasing handle.

As can be seen in FIG. 4, said arm 29a, 29b of the releasing handle is provided with a collar 49a, 49b, having a diameter larger than the diameter of the opening 47a, 47b, so that the arm cannot project further towards the rear portion of the latch and the notch 45a, 45b cannot become disengaged from the edge of the window 43, 43b.

Always with reference to FIG. 4, it is to be noted that the end portions of the arms 29a, 29b of the releasing handle, beyond the notches 45a, 45b, are preferably tapered, so as to make the engagement with the respective latch easier.

Figure 5:
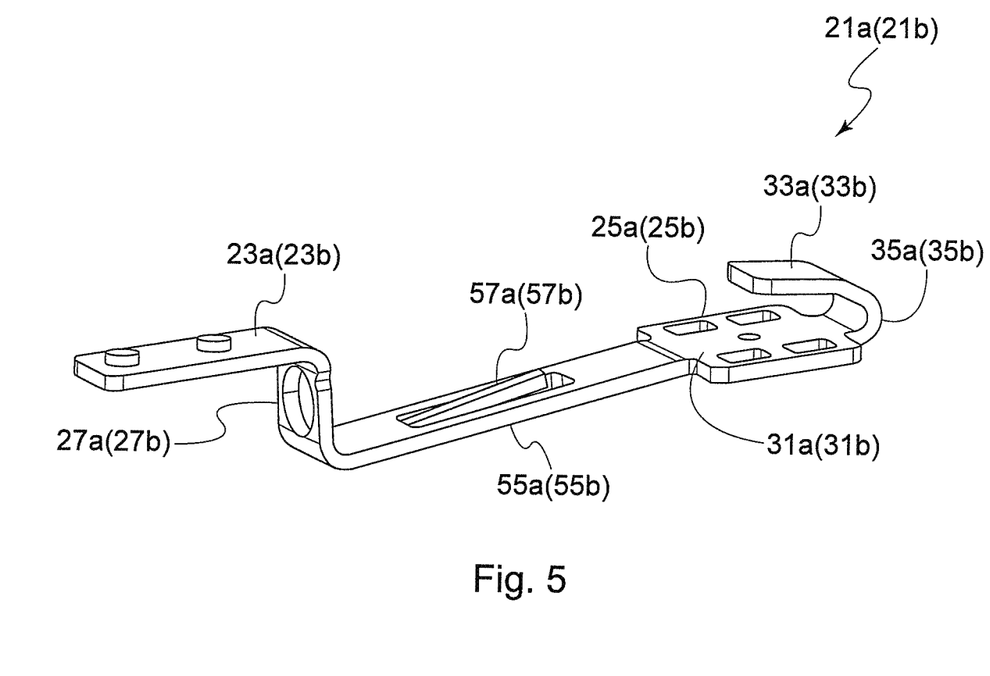
FIG. 5 is a perspective view of one of the latches of the sliding device of FIGS. 1a-1b according to a first variant.

With reference now to FIG. 5, a latch 21a, 21b according to a first variant of the latch of FIG. 3 is shown.

Also according to the variant of FIG. 5, the latch 21a, 21b has a front portion 23a, 23b and a rear portion 25a, 25b, joined by an intermediate portion 27a, 27b, said front portion 23a, 23b being intended to be fixed to the respective upper rail 7a, 7b and said rear portion 25a, 25b being intended to exert a latching effect on the respective lower rail 5a, 5b.

Furthermore, also according to the variant of FIG. 5, the rear portion 25a, 25b of each latch 21a, 21b is bent into a "U" shape and comprises a lower leg 31a, 31b and un upper leg 33a, 33b, joined by a curved, vertically oriented section 35a, 35b, said lower leg 31a, 31b carrying latching elements 37a, 37b configured to cooperate with corresponding latching elements of the lower rails and said upper leg 33a, 33b being intended to engage the end portion of a respective arm of the releasing handle 29.

The latch 21a, 21b of FIG. 5 differs from the latch shown in FIG. 3 in that the lower leg 31a, 31b comprises a prolongation 55a, 55b extending towards the intermediate portion 27a, 27b and an upwardly projecting rib 57a, 57b is provided on said prolongation 55a, 55b.

The upwardly projecting rib 57a, 57b is arranged to penetrate into a corresponding groove provided in the bottom surface of the corresponding arm 29a, 29b of the releasing handle 29. Said upwardly projecting rib 57a, 57b allows to ensure a positive engagement between the latch 21a,21b and the corresponding arm of the releasing handle.

Thanks to the provision of the upwardly projecting rib 57a, 57b, the coupling between the lower surface of the upper leg 33a,33b of the latch 21a,21b and the upper surface of the corresponding arm of the releasing handle can be sufficient for obtaining the engagement between said latch and said arm of said releasing handle.

As can be seen in FIG. 5, the upwardly projecting rib 57a, 57b preferably has a tapered shape, the height of said rib increasing going from the intermediate portion 27a, 27b of the latch towards the rear portion thereof. This tapered shape allows to obtain a progressively positive engagement between the latch 21a,21b and the corresponding arm of the releasing handle.

Figure 6:
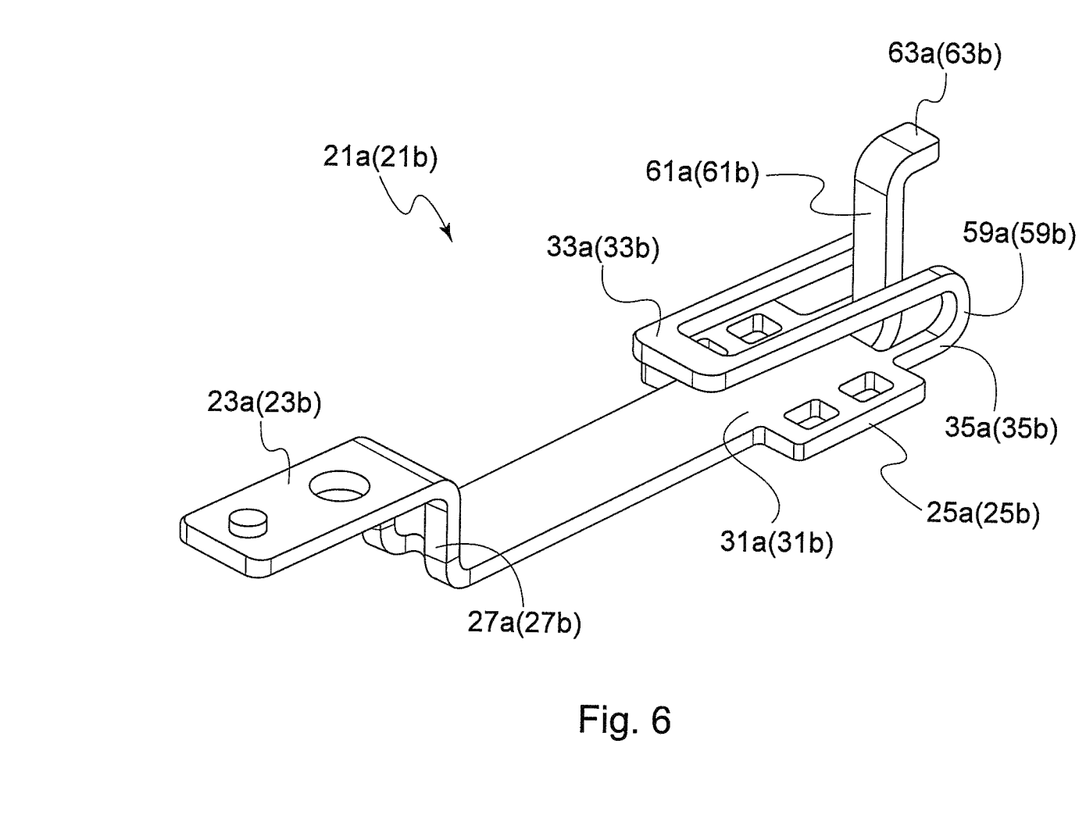
FIG. 6 is a perspective view of one of the latches of the sliding device of FIGS. 1a-1b according to a second variant.

With reference now to FIG. 6, a latch 21a, 21b according to a second variant of the latch of FIG. 3 is shown.

Also according to the variant of FIG. 6, the latch 21a, 21b has a front portion 23a, 23b and a rear portion 25a, 25b, joined by an intermediate portion 27a, 27b, said front portion 23a, 23b being intended to be fixed to the respective upper rail 7a, 7b and said rear portion 25a, 25b being intended to exert a latching effect on the respective lower rail 5a, 5b.

Furthermore, also according to the variant of FIG. 6, the rear portion 25a, 25b of each latch 21a, 21b is bent into a "U" shape and comprises a lower leg 31a, 31b and un upper leg 33a, 33b, joined by a curved, vertically oriented section 35a, 35b, said lower leg 31a, 31b carrying latching elements 37a, 37b configured to cooperate with corresponding latching elements of the lower rails and said upper leg 33a, 33b being intended to engage the end portion of a respective arm of the releasing handle 29.

The latch 21a, 21b of FIG. 6 differs from the latch shown in FIG. 3 in that the curved, vertically oriented section 35a, 35b of the rear portion of the latch is provided with two parallel slits defining two side portions 59a, 59b joining the lower and upper legs of the rear portion of the latch and a middle portion 61a, 61b extending in a substantially vertical direction and ending with a rearwardly bent free end 63a, 63b.

The rearwardly bent free end 63a, 63b of said middle portion is configured to protrude through the corresponding upper rail 7a, 7b and can be advantageously used for adjusting the upper and lower rails relative to each other before assembly of the releasing handle.

This arrangement provides for an improved flexibility in the assembly sequence and reduces the complexity of said assembly sequence.

Referring again to FIG. 3, as mentioned above, each latch 21a, 21b has a front portion 23a, 23b, which is fixed to the respective upper rail 7a, 7b.

As can be seen in FIG. 3, said front portion 23a, 23b may be provided with at least two bosses 51a, 51b which are aligned along the longitudinal axes of the upper rails and are spaced apart from each other along the direction of said longitudinal axes.

Said bosses are configured to protrude through corresponding holes provided in the upper wall 15a, 15b of the corresponding "U"-shaped upper rail 7a, 7b.

Thanks to the presence of said aligned and spaced apart bosses 51a, 51b, any relative rotation between the latch and the corresponding upper rail can be prevented.

The latches 21a, 21b may be fixed to the upper rails also at their intermediate portions 27a, 27b.

As shown in FIG. 3, the walls of said intermediate portions 27a, 27b have a shaped profile comprising indentations 53a, 53b, through which a positive lock with the lateral walls 17a, 17b of the "U"-shaped upper rail 7a, 7b can be obtained.

Figure 7:
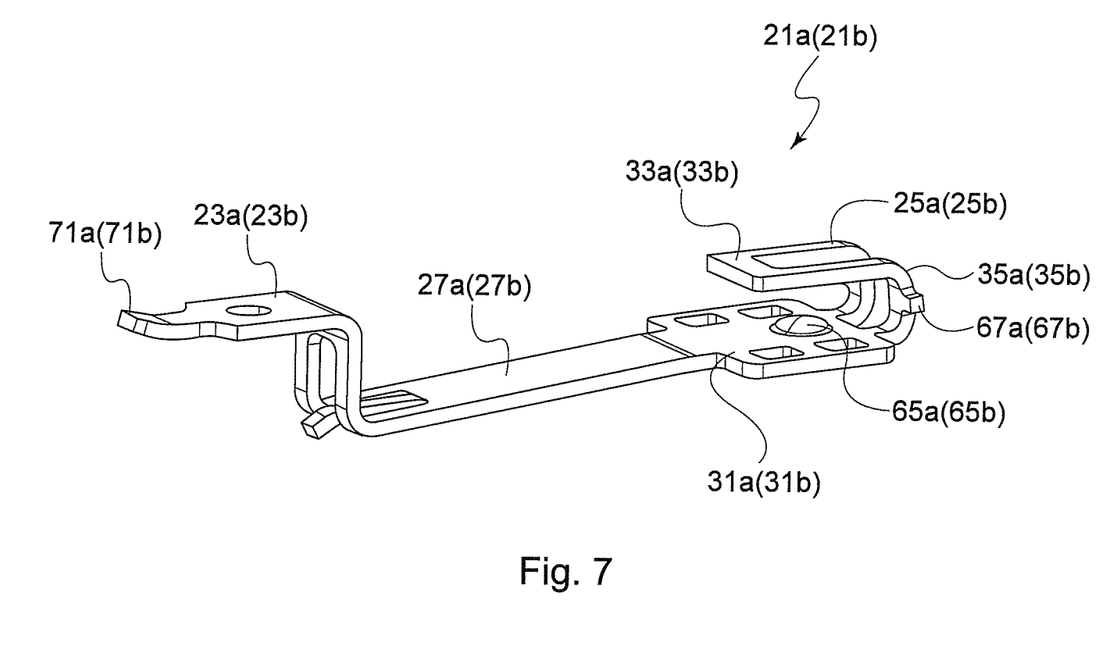
FIG. 7 is a perspective view of one of the latches of the sliding device of FIGS. 1a-1b according to a third variant.

With reference now to FIG. 7, a latch 21a, 21b according to a third variant of the latch of FIG. 3 is shown.

Also according to the variant of FIG. 7, the latch 21a, 21b has a front portion 23a, 23b and a rear portion 25a, 25b, joined by an intermediate portion 27a, 27b, said front portion 23a, 23b being intended to be fixed to the respective upper rail 7a, 7b and said rear portion 25a, 25b being intended to exert a latching effect on the respective lower rail 5a, 5b.

Furthermore, also according to the variant of FIG. 7, the rear portion 25a, 25b of each latch 21a, 21b is bent into a "U" shape and comprises a lower leg 31a, 31b and un upper leg 33a, 33b, joined by a curved, vertically oriented section 35a, 35b, said lower leg 31a, 31b carrying latching elements 37a, 37b configured to cooperate with corresponding latching elements of the lower rails and said upper leg 33a, 33b being intended to engage the end portion of a respective arm of the releasing handle 29.

First of all, the latch 21a, 21b of FIG. 7 differs from the latch shown in FIG. 3 in that a dome-shaped, upwardly oriented projection 65a, 65b is provided on the lower leg 31a, 31b of the rear portion of the latch, at the longitudinal axis of said lower leg or close to such longitudinal axis.

Figure 8:
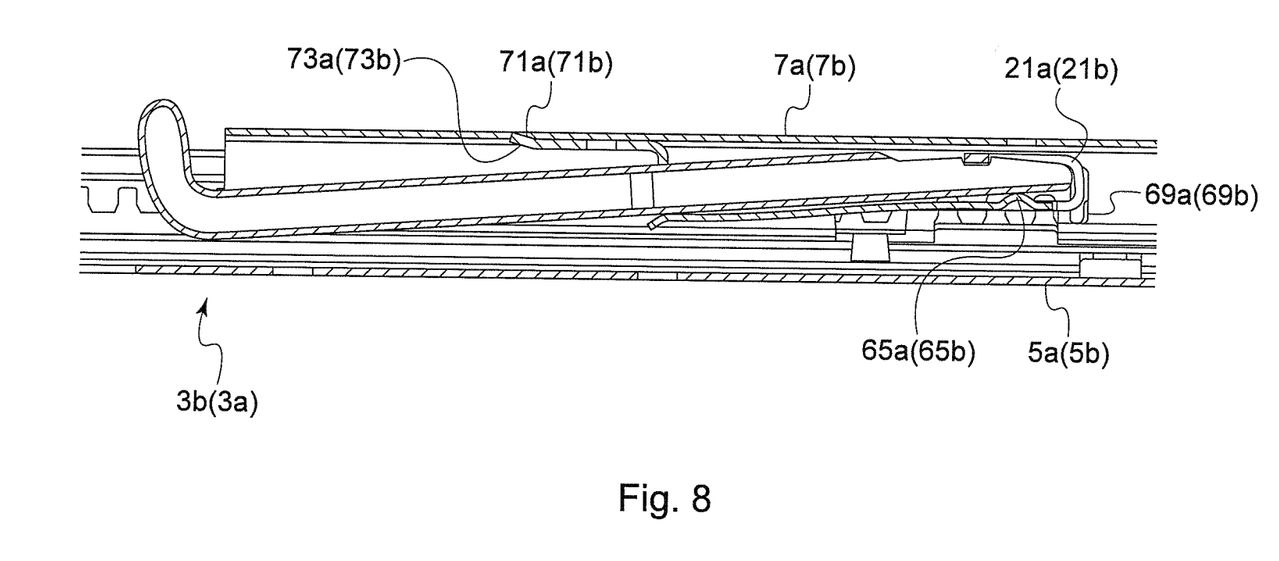
FIG. 8 is a cross-sectional view of the sliding device of FIG. 1a along the line II-II, incorporating a latch according to the third variant.

Thanks to the provision of such dome-shaped projection 65a, 65b, the lower leg of the latch will always contact the corresponding arm of the releasing member at the position of said dome-shaped projection (see also FIG. 8). Accordingly, the transmission of forces between the latch and the releasing member will also occur at said dome-shaped projection, with little or no contribution from the other surrounding surfaces.

Advantageously, as the point at which forces are transmitted is fixed and known, the design of the latch 21a, 21b according to this third variants helps to achieve a consistent release effort of the releasing member.

Secondly, the latch 21a, 21b of FIG. 7 differs from the latch shown in FIG. 3 in that an outwardly extending safety tab 67a, 67b is provided on either sides of the intermediate portion 27a, 27b of the latch 21a, 21b.

Each of said safety tabs 67a, 67b engages a corresponding slot 69a, 69b provided in the upper rail (see FIG. 8).

Thanks to the engagement of the safety tabs 67a, 67b in the corresponding slots 69a, 69b, it is possible to prevent the rear portion of the latch from excessively moving downwards when a high load is applied. Therefore, the rear portion of the latch is prevented from hitting the lower rail in case of high loads.

Moreover, the engagement of the safety tabs 67a, 67b in the corresponding slots 69a, 69b helps in correctly guiding the movement rear portion of the latch in the up-down direction, thus avoiding misalignments.

Thirdly, the latch 21a, 21b of FIG. 7 differs from the latch shown in FIG. 3 in that the intermediate portion 27a, 27b and the rear portion 25a, 25b of the latch 21a, 21b are not aligned to each other, i.e. they do not lie on the same plane.

This configuration helps to improve the strength of the locking system as the intermediate portion 27a, 27b and the rear portion 25a, 25b of the latch 21a, 21b can be inclined relative to each other in such a way that said rear portion of said latch is as close as possible to be parallel to the lower rail (i.e. horizontal), which improves the engagement between the latching elements of the upper and lower rails, thus allowing to achieve a stronger locking effect.

Furthermore, the latch 21a, 21b of FIG. 7, too, includes means for preventing any relative rotation between the latch and the corresponding upper rail, as in the latch shown in FIG. 3.

However, in this variant the anti-rotation bosses provided in the latch of FIG. 3 are replaced by a hook 71a, 71b upwardly projecting from the front portion 23a, 23b of the latch 21a, 21b. Such hook 71a, 71b is intended to engage a corresponding cutout 73a, 73b in the corresponding upper rail (see FIG. 8).

Figure 2:
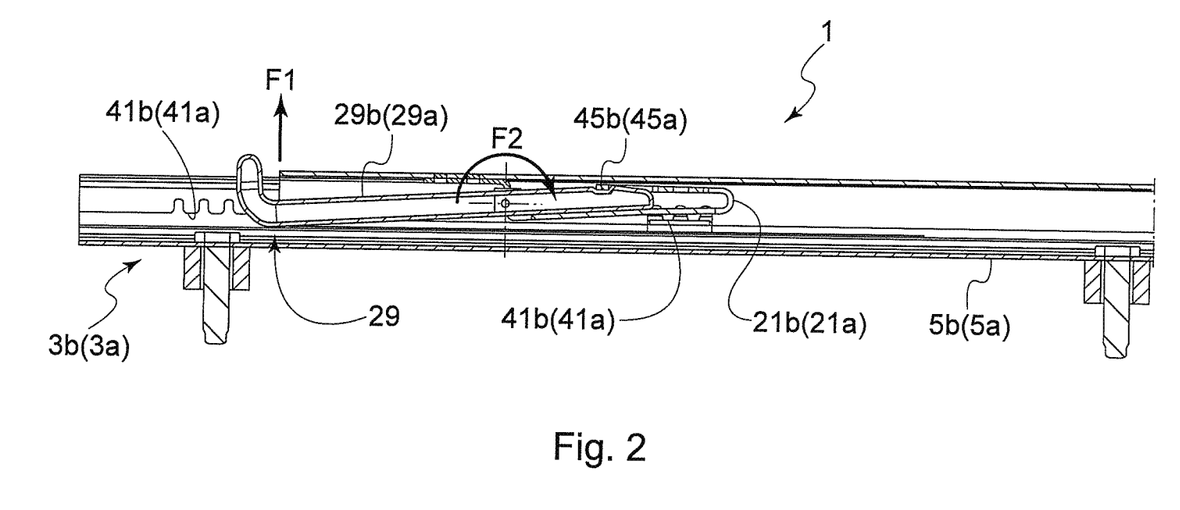
FIG. 2 is a cross-sectional view of the sliding device of FIG. 1a along the line II-II.

The operation of the sliding device 1 according to the invention will be briefly disclosed with reference to FIG. 2.

The latches 21a, 21b are shaped in such a way that when they are in a rest condition, i.e. in the absence of any stresses acting on them, the latching elements (i.e. the through-holes 37a, 37b) on their rear portion 25a, 25b engage the respective latching elements (i.e. the teeth 41a, 41b) of the lower rails 5a, 5b, thus locking the upper rails relative to the lower rails.

With the latches in this locking position, the displacement of the upper rails 7a, 7b relative to the lower rails 5a, 5b of the slideways 3a, 3b is effectively prevented.

In order to adjust the position of the vehicle seat relative to the vehicle floor, the latches 21a, 21b can be driven to the unlocking position by pulling the gripping portion 29c of the releasing handle 29 upwardly (see arrow F1 in FIG. 2).

As a consequence, the arms 29a, 29b of the releasing handle will rotate, the edge of the opening 47a, 47b in the intermediate portion 27a, 27b of the latches serving as fulcrum for such rotation (see arrow F2 in FIG. 2).

As a result of such rotation, the end portions of the arms 29a, 29b of the releasing handle 29 will pull the rear portions 25a, 25b of the latches 21a, 21b downwardly, thus disengaging the latching elements (i.e. the through-holes 37a, 37b) of said latches from the respective latching elements (i.e. the teeth 41a, 41b) of the lower rails and allowing the upper rails to be displaced relative to the lower rails.

Once the user releases the gripping portion 29c of the handle 29, the latches 21a, 21b return to their rest position, in which they lock the upper rails 7a, 7b relative to the lower rails 5a, 5b in the new set position.

From the above disclosure, the advantages of the invention will be evident.

The shape of the rear portion of the latches allows to provide a firm engagement between the upper leg of said rear portion of said latches and the end portion of the arms of the releasing handle.

The axial displacement of the arms of the handle relative to the latches is prevented both by the engagement with the engaging elements provided at the rear portion of the latches and by the provision on said arms of the collars with a diameter larger than the diameter of the opening in the intermediate portion of said latches.

By providing the latching elements in the rear portion of the latches in the form of through-holes, a very firm engagement with the latching elements of the lower rails against displacement in any direction can be obtained.

Due to the fact that the arms of the releasing handle pivot about the intermediate portions of latches (i.e. closer to the rear portion of said latches when compared to prior art solutions), slight, accidental movements of the releasing handle are not sufficient for causing an undesired disengagement of the latching elements of the latches from the latching elements of the lower rails.

The above description of a preferred embodiment of the invention has been given merely by way of example and several variants and modifications within the reach of the person skilled in the art can be envisaged, without departing from the scope of the invention as defined by the appended claims.

More particularly, it will be evident to the person skilled in the art that individual features of the different variants of the latch of the sliding device according to the invention shown in the present disclosure could be associated to each other according to any possible combination, thus resulting in new, advantageous variants of the invention.

The invention claimed is:

1. A sliding device for a vehicle seat, which sliding device comprises a pair of parallel slideways, each comprising a lower rail, an upper rail, that is slidably mounted to the lower rail, and a latch, which is arranged between the lower rail and the upper rail and selectively allows/prevents movement of the upper rail relative to the lower rail, wherein in a rest condition the latches of both parallel slideways are in a locking position, in which they prevent movement of the upper rails relative to the lower rails, and wherein the sliding device comprises a releasing member for driving the latches to an unlocking position in which they allow movement of the upper rails relative to the lower rails, wherein the releasing member is made as a "U"-shaped releasing handle comprising a middle gripping portion and two substantially parallel arms, wherein each of the latches comprises a front portion and a rear portion joined by an intermediate portion, wherein the front portion of each latch is fixed to a respective one of the upper rails and the rear portion of each latch is bent into a "U" shape comprising a lower leg and un upper leg, joined by a curved, vertically oriented section, wherein latching elements configured to cooperate with corresponding latching elements provided in the lower rails are provided in the lower legs of the rear portions of the latches, and wherein the upper legs of the rear portions of the latches are configured to engage the releasing member and are provided with engaging elements configured to cooperate with engaging elements provided at end portions of the arms of the releasing handle.

2. The sliding device according to claim 1, wherein the engaging elements of the releasing member comprise a notch provided at the end portions of each arm and the engaging elements of the latches comprise a window provided in the upper leg of the rear portion of each latch, the edge of each of the windows being arranged to become engaged in a corresponding one of the notches.

3. The sliding device according to claim 2, wherein the end portions of the arms of the releasing handle are tapered beyond the notches.

4. The sliding device according to claim 1, wherein each of the lower rails has a cross-section having a shape of an upwardly open "U" and comprises a lower wall and a pair of parallel, upwardly oriented vertical walls, ending with respective inwardly and downwardly bent edges, and each of the upper rails has a cross-section having a shape of a downwardly open "U" and comprises an upper wall and a pair of parallel, downwardly oriented vertical walls, ending with respective outwardly and upwardly bent edges, the outwardly and upwardly bent edges of the upper rails being engaged under the inwardly and downwardly bent edges of the lower rails.

5. The sliding device according to claim 4, wherein the latching elements provided in the lower rails comprise a plurality of downwardly extending teeth provided along the inwardly and downwardly bent edges and the latching elements of the latches comprise a plurality of through-holes arranged in lateral wings extending on both sides of the lower leg of the rear portion of each latch.

6. The sliding device according to claim 1, wherein the intermediate portion of each latch includes substantially vertically oriented section that is provided with an opening for passage of one of the arms of the releasing handle, an edge of each of the openings of the intermediate portions of the latches serving as a fulcrum for the rotation of one of the arms of the releasing handle.

7. The sliding device according to claim 6, wherein each arm of the releasing handle comprises a collar having a diameter larger than a diameter of each of the openings in the intermediate portions of the latches.

8. The sliding device according to claim 1, wherein the intermediate portion of each of the latches has a shaped profile comprising indentations for positive locking to a respective one of the upper rails.

9. The sliding device according to claim 1, wherein a dome-shaped, upwardly oriented projection is provided on the lower leg of the rear portion of each latch, at a longitudinal axis of the lower leg or close to the longitudinal axis of the lower leg.

10. The sliding device according to claim 1, wherein an outwardly extending safety tab is provided on either sides of the rear portion of each latch, each of the safety tabs being received in and engaging a corresponding slot provided in a respective one of the upper rails.

11. The sliding device according to claim 1, wherein the intermediate portions of the latches are inclined with respect to the rear portions of the latches.

12. The sliding device according to claim 1, wherein the front portion of each of the latches is provided with an upwardly projecting hook, the hook being received in a corresponding cutout provided in a respective one of the upper rails.

* * * * *